(12) United States Patent
Ganireddy et al.

(10) Patent No.: US 10,951,030 B2
(45) Date of Patent: Mar. 16, 2021

(54) SYSTEM AND METHOD FOR REACTIVE POWER CONTROL OF A WIND FARM

(71) Applicant: General Electric Company, Schenectady, NY (US)

(72) Inventors: Govardhan Ganireddy, Roanoke, VA (US); Rajni Burra, Clifton Park, NY (US); Wei Ren, Niskayuna, NY (US); Anthony Michael Klodowski, Hardy, VA (US); Saurabh Shukla, Clifton Park, NY (US); Zhuohui Tan, Shanghai (CN); Robert Gregory Wagoner, Roanoke, VA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/611,007

(22) PCT Filed: May 2, 2018

(86) PCT No.: PCT/US2018/030667
§ 371 (c)(1),
(2) Date: Nov. 5, 2019

(87) PCT Pub. No.: WO2018/204504
PCT Pub. Date: Nov. 8, 2018

(65) Prior Publication Data
US 2020/0083710 A1    Mar. 12, 2020

(30) Foreign Application Priority Data
May 5, 2017    (CN) .......................... 201710312375.5

(51) Int. Cl.
*H02J 3/18*    (2006.01)
*H02J 3/38*    (2006.01)

(52) U.S. Cl.
CPC ................ *H02J 3/18* (2013.01); *H02J 3/386* (2013.01)

(58) Field of Classification Search
CPC .................. H02J 3/18; H02J 3/386; H02J 3/38
See application file for complete search history.

(56) References Cited

U.S. PATENT DOCUMENTS

| | | |
|---|---|---|
| 3,593,106 A | 7/1971 | Lafuze |
| 4,281,371 A | 7/1981 | Baker |
| (Continued) | | |

FOREIGN PATENT DOCUMENTS

| | | |
|---|---|---|
| CN | 105356520 A | 2/2016 |
| EP | 1276219 A1 | 1/2003 |
| (Continued) | | |

OTHER PUBLICATIONS

PCT International Search Report Corresponding to PCT/US2018/030667 dated May 2, 2018.

(Continued)

*Primary Examiner* — Robert L Deberadinis
(74) *Attorney, Agent, or Firm* — Dority & Manning, P.A.

(57) ABSTRACT

A method for reactive power control of a wind farm having a plurality of clusters of wind turbines with a cluster transformer connecting each cluster of wind turbines to a power grid is provided. The method includes receiving, via a plurality of cluster-level controllers, a reactive power command from a farm-level controller. The method also includes generating, via the cluster-level controllers, a cluster-level reactive current command for each cluster of wind turbines based on the reactive power command. Further, the method includes distributing, via the cluster-level controllers, a turbine-level reactive current command to turbine-level controllers of the wind turbines based on the cluster-level reactive current command.

20 Claims, 10 Drawing Sheets

(56) References Cited

U.S. PATENT DOCUMENTS

| | | |
|---|---|---|
| 5,047,910 A | 9/1991 | Levran et al. |
| 7,119,452 B2 | 10/2006 | Larsen |
| 7,166,928 B2 | 1/2007 | Larsen |
| 7,187,566 B2 | 3/2007 | Kawashima et al. |
| 7,212,421 B2 | 5/2007 | Chandra et al. |
| 7,224,081 B2 | 5/2007 | Larsen |
| 7,521,907 B2 | 4/2009 | Cervera et al. |
| 7,923,862 B2 | 4/2011 | Cardinal et al. |
| 8,013,580 B2 | 9/2011 | Cervera et al. |
| 8,041,465 B2 | 10/2011 | Larsen et al. |
| 8,669,669 B1 | 3/2014 | Wagoner et al. |
| 8,736,241 B2 | 5/2014 | Cervera et al. |
| 9,537,437 B2 | 1/2017 | Wagoner et al. |
| 2012/0101643 A1 | 4/2012 | Kirchner et al. |
| 2013/0286692 A1 | 10/2013 | Patel et al. |
| 2013/0289911 A1 | 10/2013 | Patel et al. |
| 2014/0062086 A1 | 3/2014 | Mata Dumenjo et al. |
| 2014/0253058 A1 | 9/2014 | Cervera et al. |
| 2014/0320056 A1 | 10/2014 | Royak et al. |
| 2015/0102674 A1 | 4/2015 | Rudolph et al. |
| 2017/0025858 A1 | 1/2017 | Garcia et al. |

FOREIGN PATENT DOCUMENTS

| | | |
|---|---|---|
| EP | 2679812 A1 | 1/2014 |
| EP | 3059830 A1 | 8/2016 |
| WO | WO2009/138808 A1 | 11/2009 |
| WO | WO2015/078471 A1 | 6/2015 |

OTHER PUBLICATIONS

PCT Written Opinion Corresponding to PCT/US2018/030667 dated Aug. 16, 2018.

European Search Report, dated Nov. 13, 2020, for EP Application No. 18795222.1.

SYSTEM AND METHOD FOR REACTIVE POWER CONTROL OF A WIND FARM

FIELD OF THE INVENTION

The present disclosure relates generally to systems and methods for controlling wind turbines, and more particularly, to systems and methods for controlling reactive power (VAR or Q) of a wind farm having a plurality of wind turbine clusters.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Figure 1:
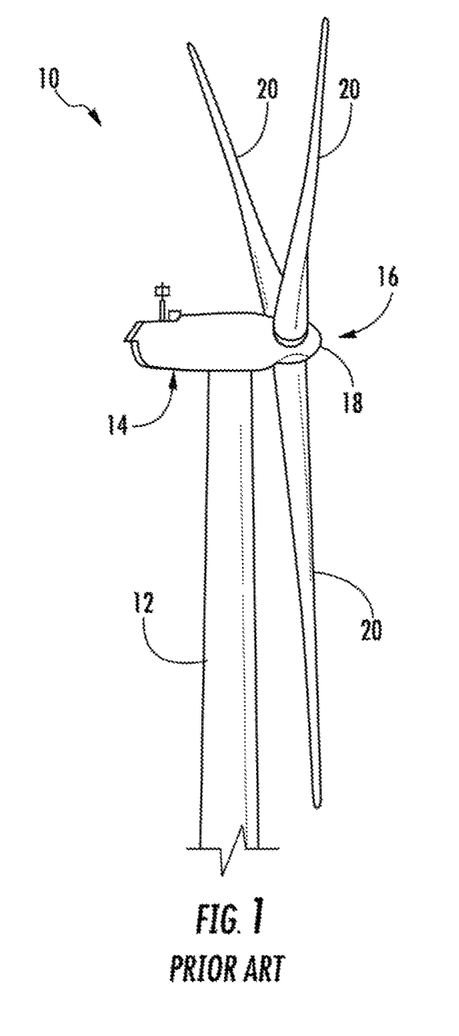
FIG. 1 illustrates a perspective view of a portion of one embodiment of a wind turbine according to conventional construction.
Figure 2:
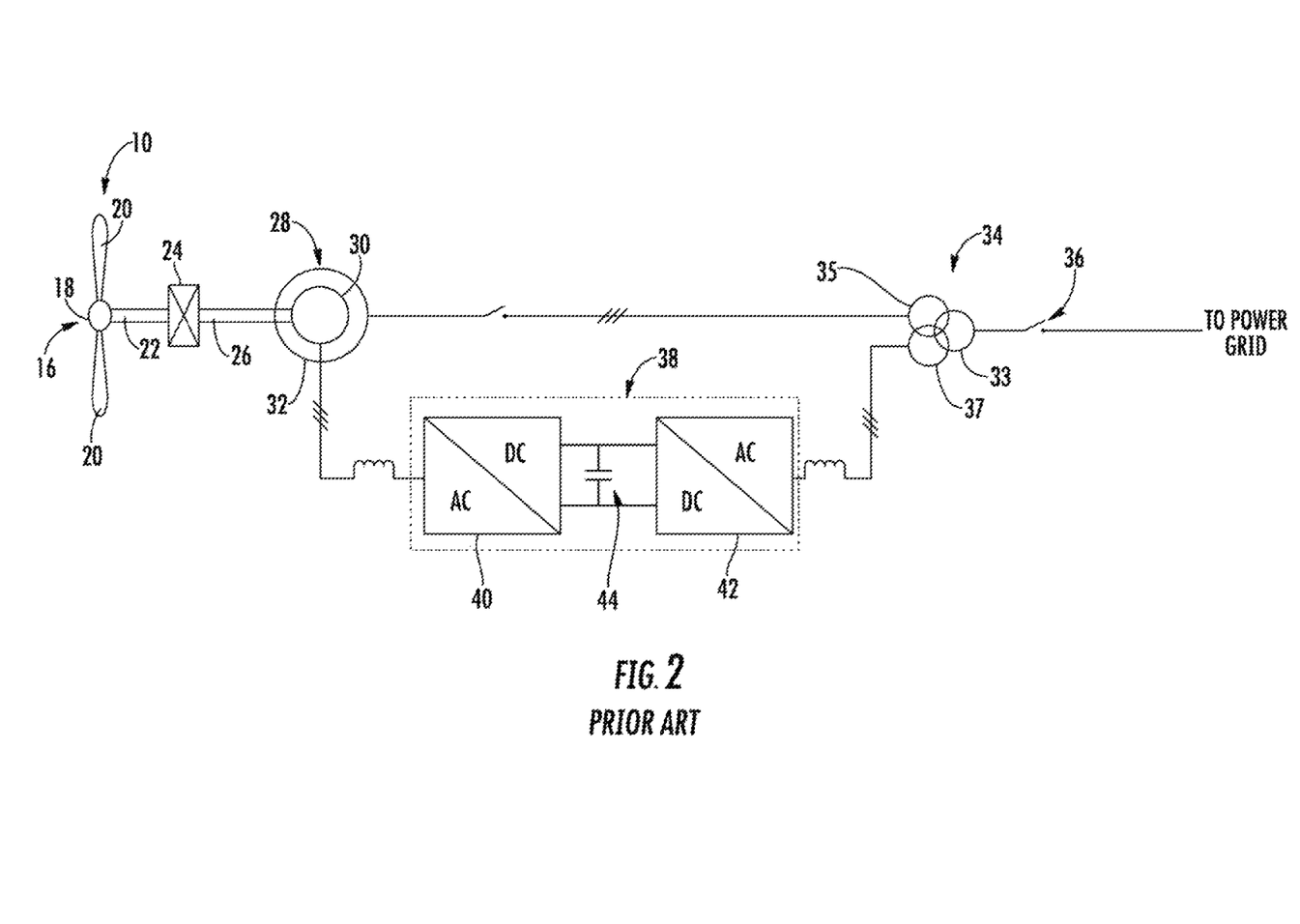
FIG. 2 illustrates a schematic diagram of a conventional electrical power system suitable for use with the wind turbine shown in FIG. 1.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

The illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Figure 3:
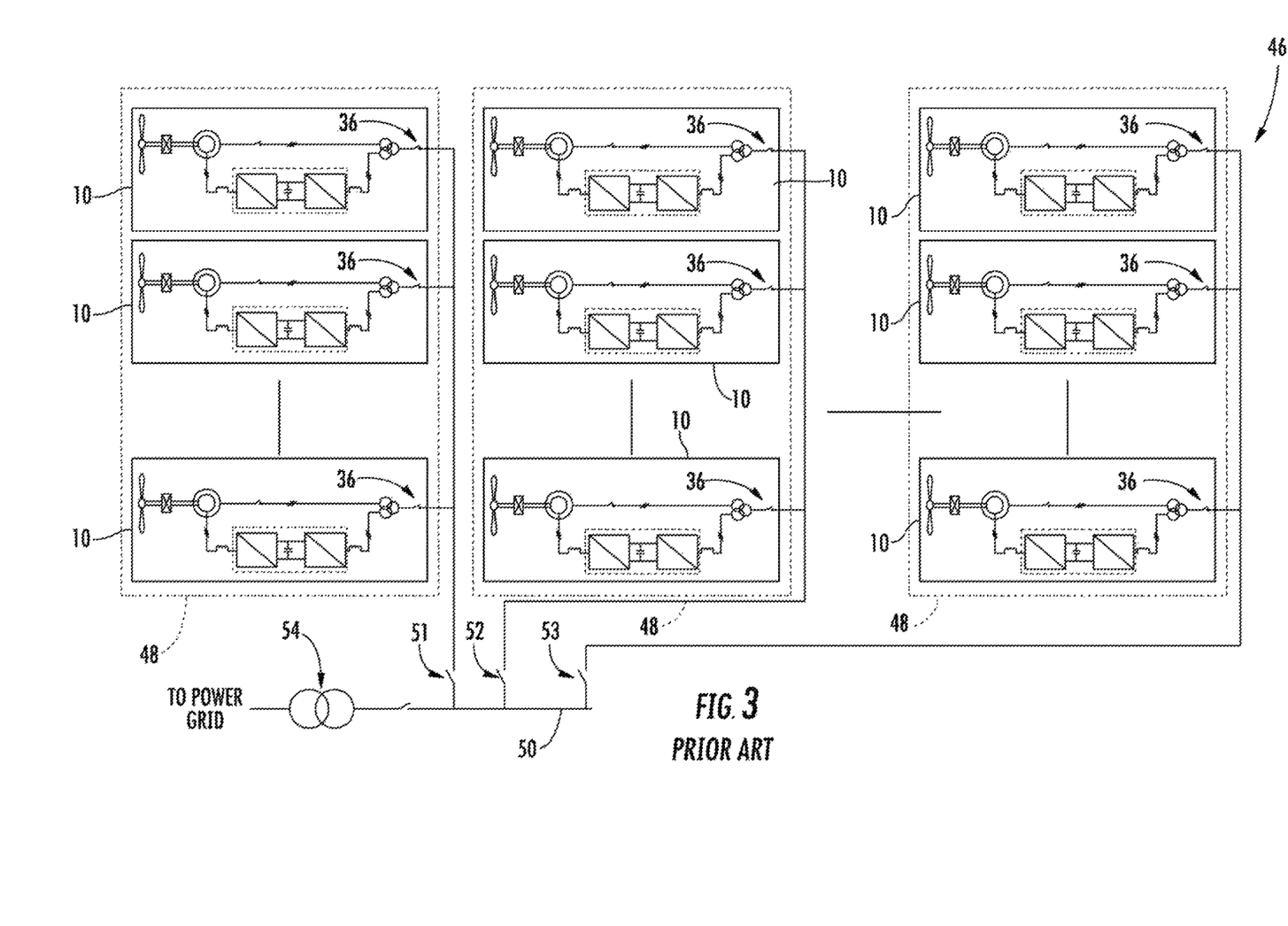
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

With the growing success of wind power production in recent years, this form of power has gained significant market share. As wind power is not a power source having a timely constant power output, but includes variations, for example due to variations of the wind speed, operators of power distribution networks have to take this into account. One of the consequences is, for example, that the distribution and transmission networks have become more difficult to manage. This pertains also to the management of the amount of reactive power flow in a network.

Figure 4:
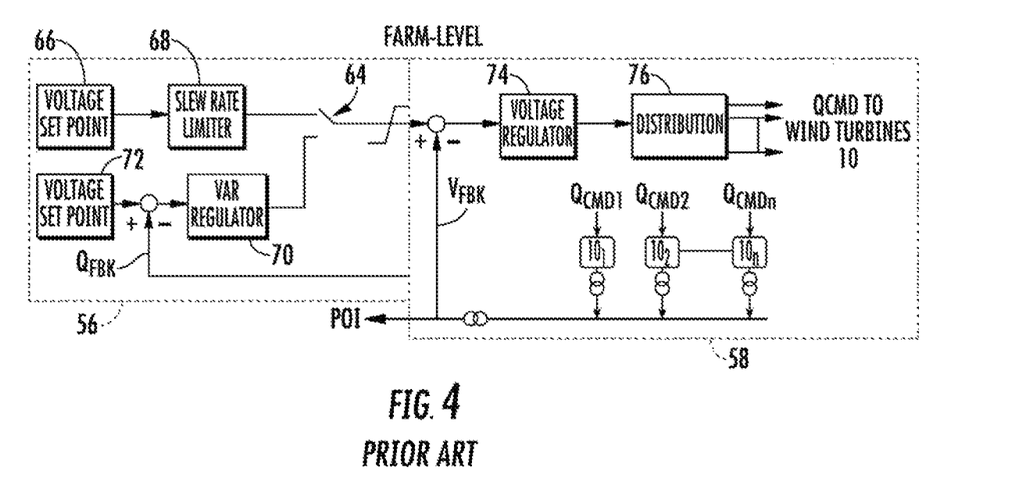
FIG. 4 illustrates a schematic diagram of one embodiment of a farm-level control scheme according to conventional construction.
Figure 5:
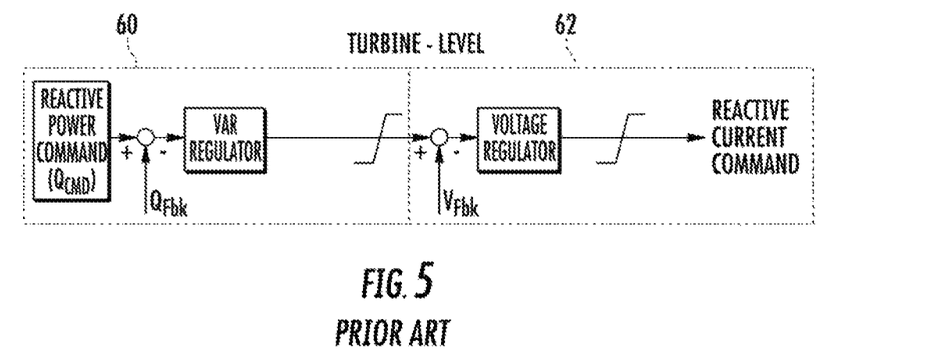
FIG. 5 illustrates a schematic diagram of one embodiment of a turbine-level control scheme according to conventional construction.

Referring now to FIGS. 4 and 5, schematic diagrams of a farm-level reactive power control scheme and a turbine-level reactive power control scheme are illustrated, respectively, according to conventional construction. More specifically, as shown in FIG. 4, the farm-level control scheme includes a fast inner voltage magnitude loop 58 and a slow outer reactive power loop 56. Further, as shown, the farm-level controller alternates between voltage control and reactive power controller via switch 64. For voltage control, the farm-level controller receives a voltage set point 66 and limits the set point via a slew rate limiter 68. For reactive power control, the farm-level controller regulates the reactive power via a VAR regulator 70 based on a reactive power set point 72 and a reactive power feedback signal $Q_{FBK}$. The farm-level controller then limits either the voltage or reactive power signal that enters the fast inner voltage magnitude loop 58. As shown at 74, another voltage regulator 74 regulates the voltage signal to determine a reactive power command for the wind farm. The farm-level controller then distributes the net reactive power command ($Q_{CMD}$) to individual wind turbines 102 (i.e. $10_1$, $10_2$, to $10_n$ and so on).

At the turbine level, as shown in FIG. 5, there is another volt/VAR control loop that consists of a faster inner magnitude loop 62 and a slower outer reactive power loop 60. Further, the three-winding transformer 34 of each wind turbine 10 provides a certain impedance that allows the wind turbines 10 in the wind farm 46 to regulate the voltage at the secondary winding of the three-winding transformer. This in turn enables regulating the voltage at the point of interconnection (POI) or the point of common coupling (POCC). Thus, the faster inner magnitude loop 62 provides the grid with fast voltage magnitude support for transient events, while the slower outer reactive power loop 60 provides VAR balance between the wind turbines 10 in steady state.

In such systems, however, the three-winding transformers 34 associated with each wind turbine 10 is expensive. Particularly, the secondary winding 35 of the transformer 34 that is connected to the generator stator 32 can be costly. Thus, it would be advantageous to eliminate such three-winding transformers from wind turbine power systems. The output of two or more wind turbines are directly coupled to medium voltage collection system together. The collection system then connects the wind turbines to the secondary winding of a cluster transformer that steps up the voltage from MV level to the POI voltage level. In this configuration, the wind turbines are connected to a common point without any impedance between them. Due to the absence of impedance provided by the stator winding 35 in the three-winding transformers 34, however, the goal of each wind turbine to simply regulate the turbine terminal voltage becomes difficult.

Thus, it would be advantageous to provide a wind farm having a plurality of wind turbines without the three-winding transformer described above, but that maintains the systems' ability to control reactive power.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an electrical power system connected to a power grid. The electrical power system includes a system-level controller and a plurality of clusters of electrical power subsystems. Each of the electrical power subsystems includes a power converter electrically coupled to a generator having a generator rotor and a generator stator. Further, each of the electrical power subsystems defines a stator power path and a converter power path for providing power to the power grid. In addition, the converter power path includes a partial power transformer. The electrical power system further includes a cluster transformer connecting each cluster of electrical power subsystems to the power grid and a plurality of cluster-level controllers communicatively coupled with the system-level controller. Each of the clusters of electrical power subsystems is communicatively coupled with one of the cluster-level controllers. Each of the cluster-level controllers is configured to perform one or more operations, including but not limited to receiving, from the system-level controller, a reactive power command, generating, via each of the cluster-level controllers, a cluster-level reactive current command for each cluster of the electrical power subsystems based on the reactive power command, and, distributing, via each of the cluster-level controllers, a subsystem-level reactive current command to subsystem-level controllers of the electrical power subsystems based on the cluster-level reactive current command.

In one embodiment, the one or more operations may further include receiving a reactive power feedback signal, determining a reactive power error as a function of the reactive power command for each cluster and the reactive power feedback signal, and generating, via each of the cluster-level controllers, the cluster-level reactive current command for each cluster of electrical power subsystems based on the reactive power error.

In another embodiment, the partial power transformer may include a two-winding transformer or a three-winding transformer (i.e. for auxiliary loads).

In several embodiments, the step of generating, via each of the cluster-level controllers, the cluster-level reactive current command for each cluster of electrical power subsystems based on reactive power error may include generating, via a reactive power regulator, a first output based on the reactive power error. More specifically, in certain embodiments, the reactive power regulator may include a proportional integral (PI) controller, a proportional derivative (PD) controller, a proportional integral derivative (PID) controller, a state space controller, or another other suitable controller.

In further embodiments, the step of generating, via each of the cluster-level controllers, the cluster-level reactive current command for each cluster of electrical power subsystems based on reactive power error may include limiting, via each of the cluster-level controllers, the first output from the reactive power regulator based on a maximum voltage condition and a minimum voltage condition to obtain a voltage value. As such, the cluster-level controllers may also receive a voltage feedback signal (i.e. from the secondary winding of the cluster transformer or the point of common coupling) and determine a voltage error as a function of the voltage value and the voltage feedback. In addition, each cluster-level controller may generate a second output based on the voltage error. For example, in certain embodiments, the voltage regulator may include a proportional integral (PI) controller, a proportional derivative (PD) controller, a proportional integral derivative (PID) controller, a state space controller, or another other suitable controller.

In still further embodiments, the cluster-level controllers may be configured to limit the second output from the voltage regulator based on a maximum current condition and a minimum current condition to obtain the cluster-level reactive current command.

In particular embodiments, the generator of each of the electrical power subsystems may include a doubly-fed induction generator (DFIG). In several embodiments, the electrical power system may include a wind farm, and the electrical power subsystems may include wind turbine power systems.

In another aspect, the present disclosure is directed to a method for controlling an electrical power system. As mentioned, the electrical power system has a plurality of clusters of electrical power subsystems with a cluster transformer connecting each cluster of electrical power subsystems to a power grid. Each of the electrical power subsystems has a power converter electrically coupled to a generator with a generator rotor and a generator stator. Each of the electrical power subsystems defines a stator power path and a converter power path for providing power to the power grid. The converter power path contains a two-winding power transformer. The method includes receiving, via a plurality of cluster-level controllers, a reactive power command from a system-level controller. Further, the method includes generating, via the cluster-level controllers, a cluster-level reactive current command for each cluster of electrical power subsystems based on the reactive power command. In addition, the method includes distributing, via the cluster-level controllers, a subsystem-level reactive current command to subsystem-level controllers of the electrical power subsystems based on the cluster-level reactive current command. It should be understood that the method may further include any of the additional steps and/or features as described herein.

In yet another aspect, the present disclosure is directed to a wind farm. The wind farm includes a plurality of wind turbine clusters each include a plurality of wind turbines. Each of the wind turbines has a power converter electrically coupled to a generator with a generator rotor and a generator stator. Further, each wind turbine defines a stator power path and a converter power path for providing power to the power grid. The converter power path contains a partial power transformer. In addition, the wind farm includes a cluster transformer connecting each cluster of wind turbines to a power grid and a plurality of cluster-level controllers. Each of the cluster-level controllers is communicatively coupled to one of the wind turbine clusters. Further, the cluster-level controllers are configured to perform one or more operations, including but not limited to receiving a reactive power command from a farm-level controller, generating a cluster-level reactive current command for each cluster of wind turbines based on the reactive power command, and distributing a turbine-level reactive current command to turbine-level controllers of the wind turbines based on the cluster-level reactive current command. It should be understood that the wind farm may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a method for controlling a wind farm having a plurality of clusters of wind turbines with a cluster transformer connecting each cluster of wind turbines to a power grid. The method includes receiving, via a plurality of cluster-level controllers, a reactive power command from a farm-level controller. The method also includes generating, via the cluster-level controllers, a cluster-level reactive current command for each cluster of wind turbines based on the reactive power command. Further, the method includes distributing, via the cluster-level controllers, a turbine-level reactive current command to turbine-level controllers of the wind turbines based on the cluster-level reactive current command.

As such, the system and method of the present disclosure provide many advantages not present in the prior art. For example, in the proposed topology, the voltage/VAR control loop at the turbine-level is eliminated. Instead, the same is implemented at the cluster level, thereby eliminating issues associated with all wind turbines in the cluster regulating the same terminal voltage. As such, the cluster-level controllers receive the reactive power command from the plant controller and generate the commands for the reactive component of the turbine currents. The system and method of the present disclosure also prevents volt oscillation or transient voltage stability, allowing the system to operate properly and improving power system reliability, thereby enabling elimination of the three-winding main transformer, which in turn, helps in enabling lower wind turbine and balance of plant costs, higher efficiency, higher annual energy production, and/or space saving designs.

Figure 6:
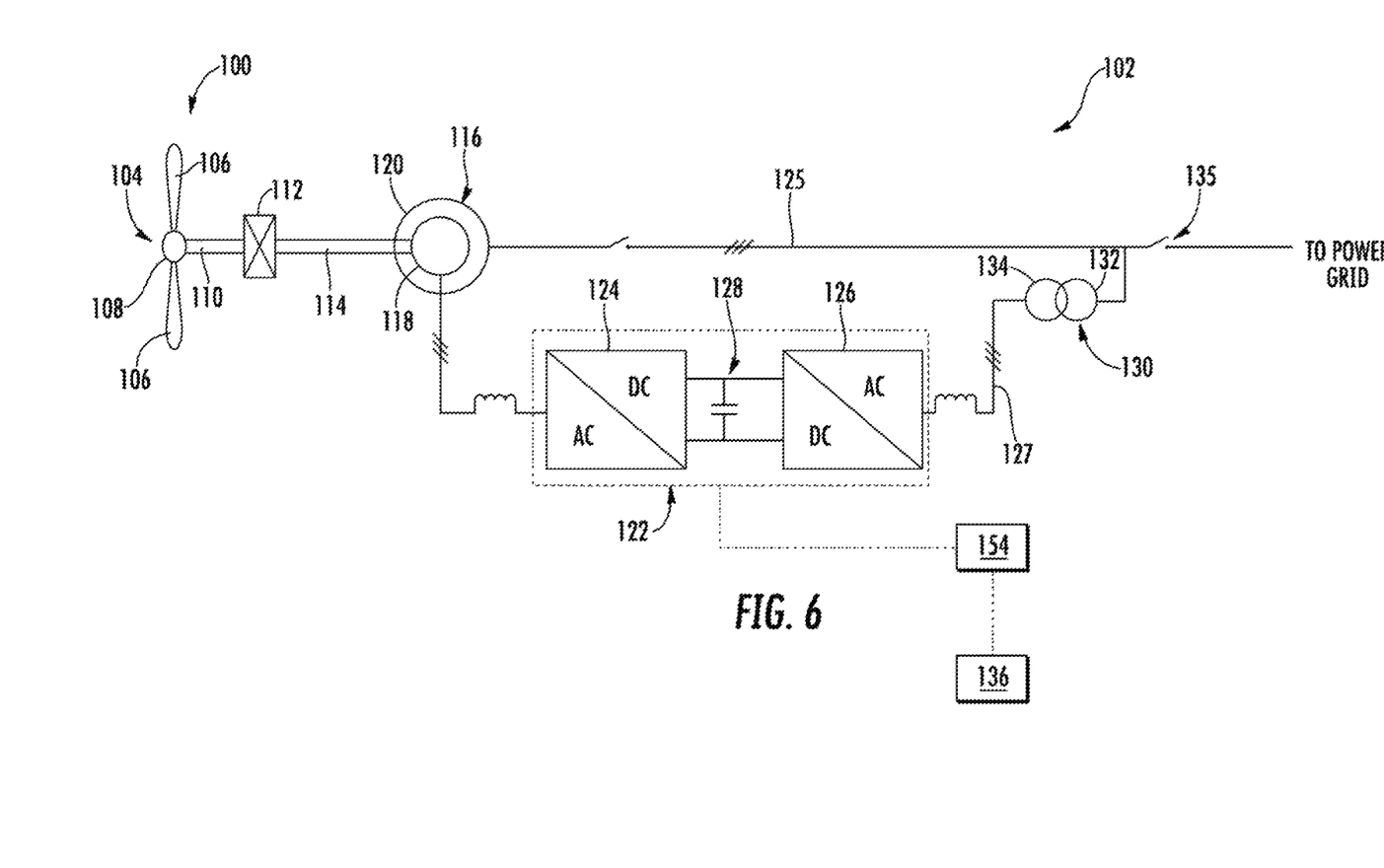
FIG. 6 illustrates a schematic diagram of one embodiment of an electrical power system for a wind turbine according to the present disclosure.

Referring now to FIG. 6, a schematic diagram of one embodiment of an electrical power subsystem 102 according to the present disclosure is illustrated. It should be understood that the term "subsystem" is used herein to distinguish between the individual power systems (e.g. as shown in FIG. 6) and the overall electrical power system 105 of FIG. 7 that includes a plurality of electrical power subsystems 102. Those of ordinary skill in the art, however, will recognize that the electrical power subsystem 102 of FIG. 6 may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 6 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the rotor side converter 124.

In addition, the electrical power system 100 may include one or more controllers. For example, the system 100 may include a system-level controller (e.g. a farm-level controller 107), one or more cluster-level controllers 176, and/or one or more subsystem-level controllers (e.g. turbine-level controllers 136). As such, the various controllers described herein are configured to control any of the components of the wind farm 105, the wind turbine clusters 137, and/or the individual wind turbines 100 and/or implement the method steps as described herein. For example, as shown particularly in FIG. 8, a block diagram of one embodiment of a controller as described herein is illustrated. As shown, the controller may include one or more processor(s) 138 and associated memory device(s) 140 configured to perform a variety of computer-implemented functions (e.g., performing the methods, steps, calculations and the like and storing relevant data as disclosed herein). Additionally, the controller may also include a communications module 142 to facilitate communications between the controller and the various components of the wind farm 105, e.g. any of the components of FIGS. 6 and 7. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 8, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 124. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the bus. It should be understood that the rotor side converter 124 and the line side converter 126 may have any configuration using any switching devices that facilitate operation of electrical power system 200 as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 7:
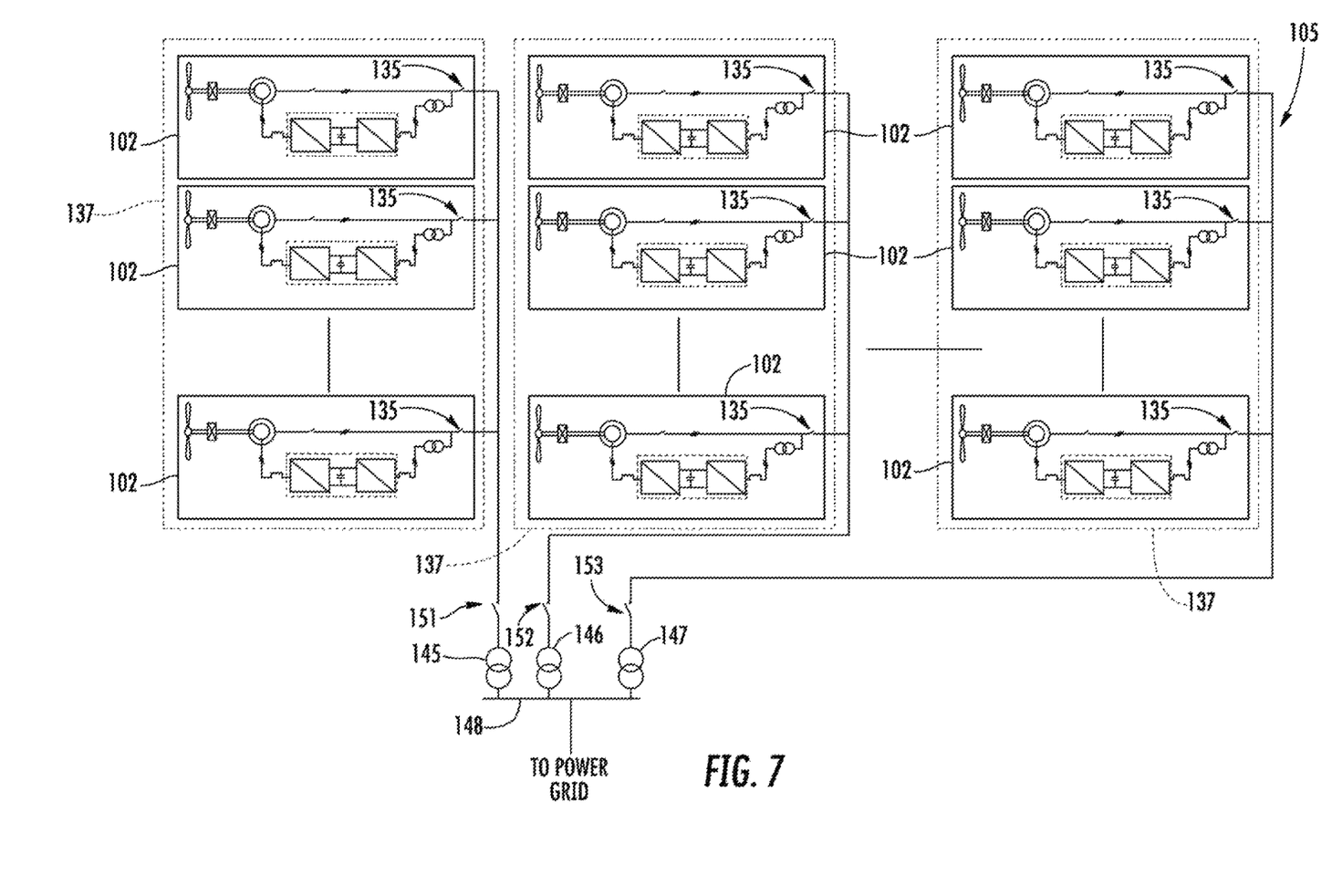
FIG. 7 illustrates a schematic diagram of one embodiment of a wind farm according to the present disclosure, particularly illustrating a plurality of wind turbine clusters each connected to the grid via a cluster transformer.
Figure 8:
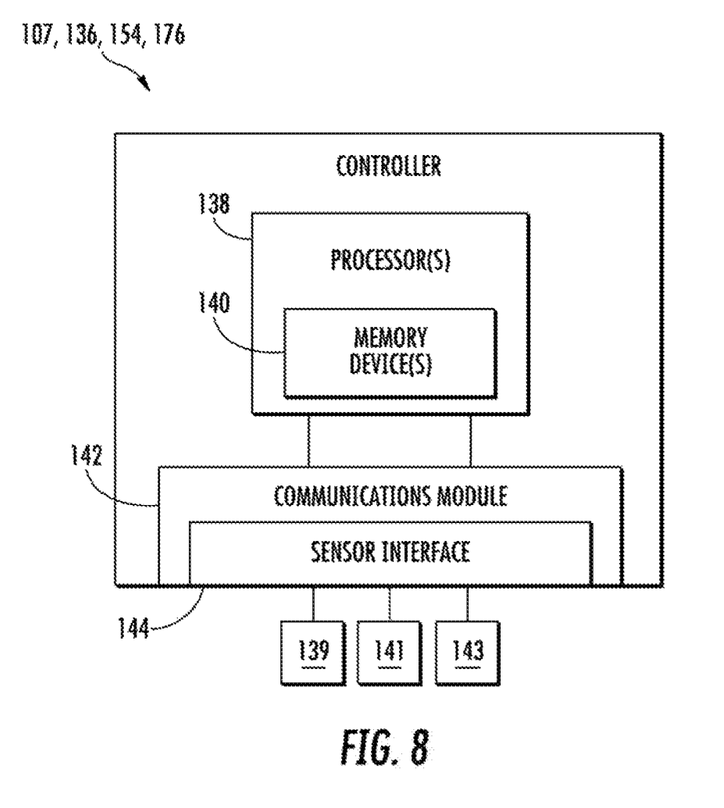
FIG. 8 illustrates a block diagram of one embodiment of a wind turbine controller according to the present disclosure.

Referring particularly to FIG. 7, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate transformer 145, 146, 147 via switches 150, 151, 152, respectively, for stepping up the voltage amplitude of the electrical power from each cluster 137 such that the transformed electrical power may be further transmitted to the power grid. In addition, as shown, the transformers 145, 146, 147 are connected to a main line 148 that combines the voltage from each cluster 137 before sending the power to the grid. Further, as mentioned, each of the clusters 137 may be communicatively coupled with a cluster-level controller 176, e.g. as shown in FIG. 11 and further discussed below.

Figure 9:
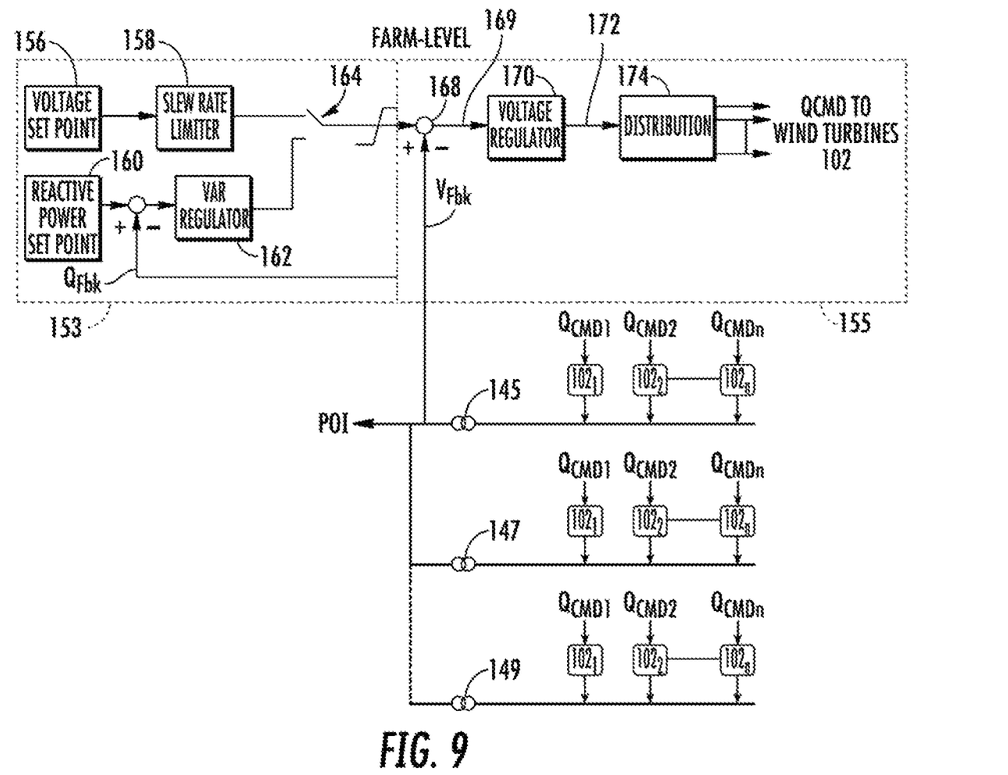
FIG. 9 illustrates a schematic diagram of one embodiment of a baseline farm-level control scheme according to the present disclosure.
Figure 10:
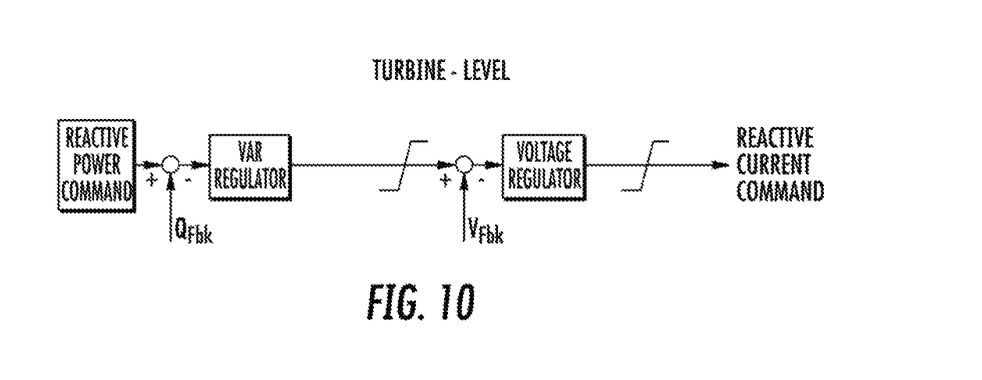
FIG. 10 illustrates a schematic diagram of one embodiment of a baseline turbine-level control scheme according to the present disclosure.
Figure 11:
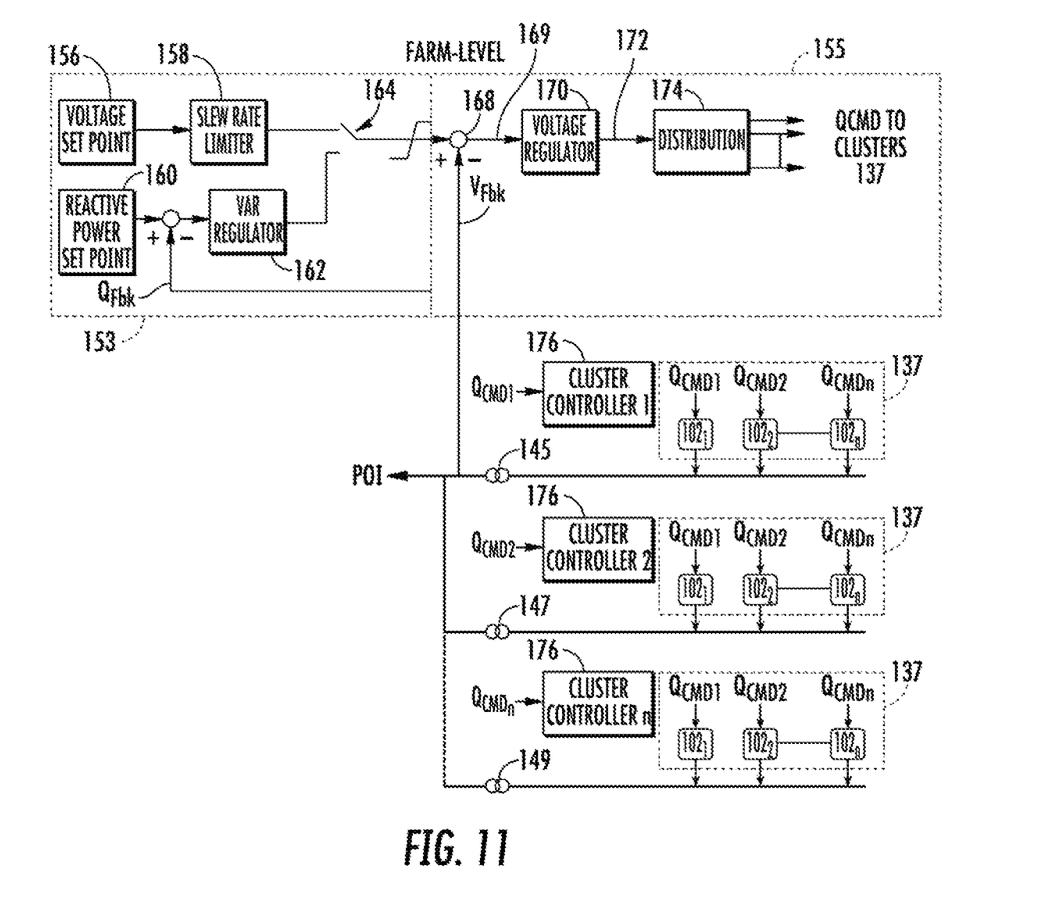
FIG. 11 illustrates a schematic diagram of one embodiment of a farm-level control scheme according to the present disclosure.
Figure 12:
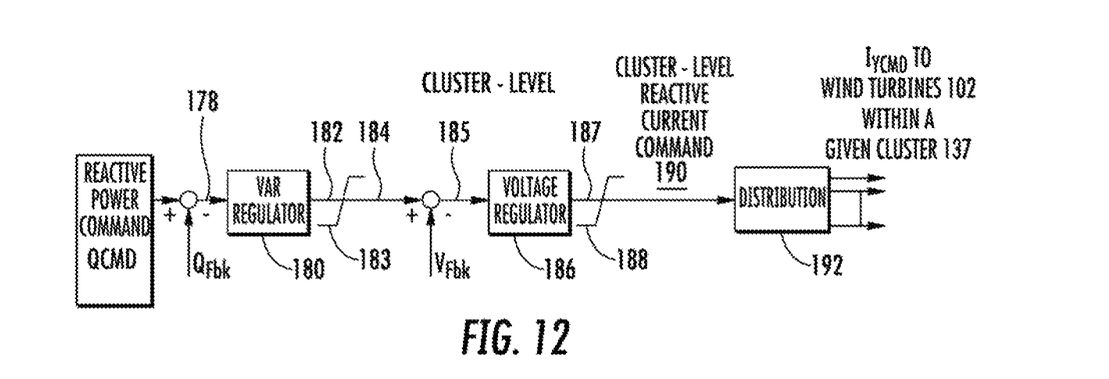
FIG. 12 illustrates a schematic diagram of one embodiment of a cluster-level control scheme according to the present disclosure.

Referring now to FIGS. 9-12, various illustrations are provided to further describe the systems and methods of the present disclosure. For example, FIG. 9 illustrates a schematic diagram of a baseline farm-level control scheme, whereas FIG. 10 illustrates a schematic diagram of one embodiment of a baseline turbine-level control scheme. However, due to the absence of impedance provided by the stator winding 35 in the main three-winding transformer 34 of conventional systems, the goal of each wind turbine regulating its terminal voltage becomes difficult. More specifically, such systems (i.e. the systems illustrated in FIGS. 9 and 10) have been known to experience reactive power oscillations. Thus, FIG. 11 illustrates a schematic diagram of one embodiment of a farm-level control scheme according to the present disclosure; and FIG. 12 illustrates a schematic diagram of one embodiment of a cluster-level control scheme according to the present disclosure that address the issues associated with the turbine-level volt-VAR loop illustrated in FIG. 10.

Referring now specifically to FIGS. 11 and 12, in the topology of the present disclosure, the turbine-level volt-VAR loop is eliminated. Instead, as shown in FIG. 12, the same is implemented at the cluster level. As such, the control scheme of the present disclosure eliminates the issue associated with all of the wind turbines 100 in the cluster 137 regulating the same terminal voltage. Rather, the cluster-level controllers 176 receive the reactive power command from the farm-level controller 107 and generate the commands for the reactive component of the turbine currents.

More specifically, as shown, the farm-level control scheme includes a fast inner voltage magnitude loop 155 and a slow outer reactive power loop 153. Further, as shown, the farm-level controller 107 alternates between voltage control and reactive power controller via switch 164. For voltage control, the farm-level controller 107 receives a voltage set point 156 and limits the set point via a slew rate limiter 158. For reactive power control, the farm-level controller 107 regulates the reactive power via a reactive power (VAR) regulator 162 based on a reactive power set point 160 and a reactive power feedback signal $Q_{FBK}$, e.g. from the power grid, e.g. at the primary side (i.e. the high voltage) of the farm substation transformers 145, 146, or 147 and/or at the secondary (i.e. medium voltage) of the farm substation transformers 145, 146, or 147. The farm-level controller 107 then limits either the voltage or reactive power signal that enters the fast inner voltage magnitude loop 155 via limiter 166. A voltage regulator 170 then regulates the voltage signal 169 to determine a reactive power command (i.e. $Q_{FARMCMD}$ 172) for the wind farm 100. Thus, as shown at 174, the farm-level controller 107 then distributes the net reactive power command ($Q_{CMD}$) to each of the cluster-level controller 176.

Referring now to FIG. 12, at the cluster-level, the cluster controllers 176 are configured to receive a reactive power command (i.e. $Q_{CMD}$) from the farm-level controller 107. In addition, as shown, the cluster-level controllers 176 also receive a reactive power feedback signal (e.g. $Q_{FBK}$) and determine a reactive power error 178 as a function of the reactive power command $Q_{CMD}$ for each cluster 137 and the reactive power feedback signal $Q_{FBK}$. Further, the cluster-level controllers 176 also generate a cluster-level reactive current command 188 for each cluster 137 of electrical power subsystems 102 based on the reactive power error 178. More specifically, in certain embodiments, the cluster-level controllers 176 may include a reactive power regulator 180 configured generate a first output 182 based on the reactive power error 178. For example, in certain embodiments, the reactive power regulator 180 may include a proportional integral (PI) controller, a proportional derivative (PD) controller, a proportional integral derivative (PID) controller, a state space controller, or another other suitable controller.

In further embodiments, as shown, the cluster-level controllers 176 may each include a limiter 183 configured to the first output 182 from the reactive power regulator 180, e.g. based on a maximum voltage condition and a minimum voltage condition to obtain a voltage value 184. As such, the cluster-level controllers 176 may also receive a voltage feedback signal $V_{FBK}$ from a secondary winding of the cluster transformer 130 or point of common coupling (designated in the figures as POI) and determine a voltage error 185 as a function of the voltage value 184 and the voltage feedback $V_{FBK}$. In addition, each cluster-level controller 176 may include a voltage regulator 186 configured to generate a second output 187 based on the voltage error 185. For example, in certain embodiments, the voltage regulator 186 may include a proportional integral (PI) controller, a proportional derivative (PD) controller, a proportional integral derivative (PID) controller, a state space controller, or another other suitable controller. In addition, as shown, the cluster-level controllers 176 may each include a limiter 188 configured to limit the second output 187 from the voltage regulator 186, e.g. based on a maximum current condition and a minimum current condition to obtain the cluster-level reactive current command 190. Thus, as shown at 192, the cluster-level controllers 176 distribute a subsystem-level reactive current command (e.g. $I_{YCMD}$) to the turbine-level controllers 136 of the wind turbines 100 based on the cluster-level reactive current command 190.

Figure 13:
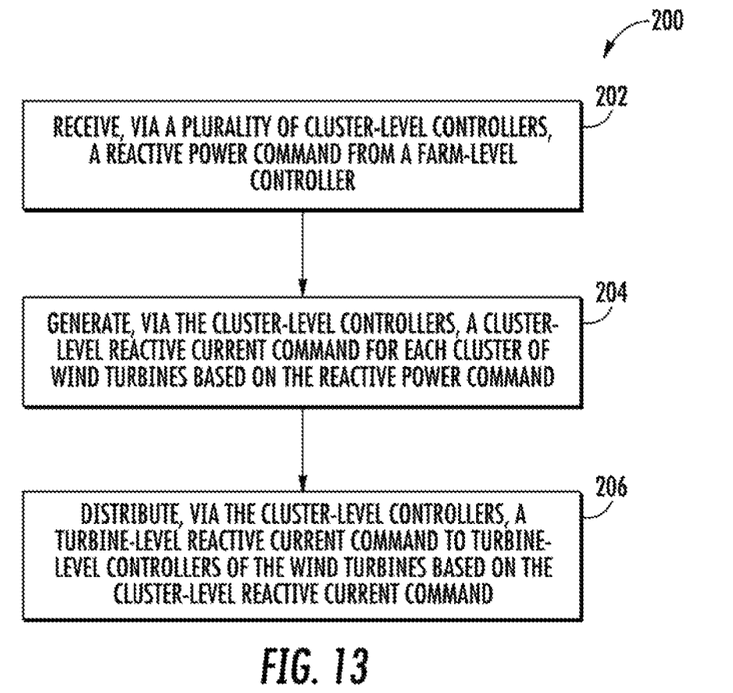
FIG. 13 illustrates a flow diagram of one embodiment of a method for controlling a wind farm according to the present disclosure.

Referring now to FIG. 13, a flow diagram of one embodiment of a method 200 controlling a wind farm (e.g. such as the wind farm 100 illustrated in FIG. 7) is illustrated according to the present disclosure. As shown at 202, the method 200 includes receiving, via a plurality of cluster-level controllers 176, a reactive power command from a farm-level controller 107. As shown at 204, the method 200 generating, via the cluster-level controllers 176, a cluster-level reactive current command for each cluster of wind turbines 100 based on the reactive power command. As shown at 206, the method 200 distributing, via the cluster-level controllers 176, a turbine-level reactive current command to turbine-level controllers 136 of the wind turbines 100 based on the cluster-level reactive current command.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system connected to a power grid, comprising:
   a system-level controller;
   a plurality of clusters of electrical power subsystems, each of the electrical power subsystems comprising a power converter electrically coupled to a generator having a generator rotor and a generator stator, each of the electrical power subsystems defining a stator power path and a converter power path for providing power to the power grid, the converter power path comprising a partial power transformer;
   a cluster transformer connecting each cluster of electrical power subsystems to the power grid; and,
   a plurality of cluster-level controllers communicatively coupled with the system-level controller, each of the clusters of electrical power subsystems communicatively coupled with one of the cluster-level controllers, each of the cluster-level controllers configured to perform one or more operations, the one or more operations comprising:
      receiving, from the system-level controller, a reactive power command;
      generating, via each of the cluster-level controllers, a cluster-level reactive current command for each cluster of electrical power subsystems based on the reactive power command; and,
      distributing, via each of the cluster-level controllers, a subsystem-level reactive current command to subsystem-level controllers of the electrical power subsystems based on the cluster-level reactive current command.

2. The electrical power system of claim 1, wherein the one or more operations further comprise:
   receiving a reactive power feedback signal;
   determining a reactive power error as a function of the reactive power command for each cluster and the reactive power feedback signal; and,
   generating, via each of the cluster-level controllers, the cluster-level reactive current command for each cluster of electrical power subsystems based on the reactive power error.

3. The electrical power system of claim 2, wherein generating, via each of the cluster-level controllers, the cluster-level reactive current command for each cluster of electrical power subsystems based on reactive power error further comprises:
   generating, via a reactive power regulator, a first output based on the reactive power error, wherein the reactive power regulator comprises at least one of a proportional integral (PI) controller, a proportional derivative (PD) controller, a proportional integral derivative (PID) controller, or a state space controller.

4. The electrical power system of claim 3, further comprising limiting, via each of the cluster-level controllers, the first output from the reactive power regulator based on a maximum voltage condition and a minimum voltage condition to obtain a voltage value.

5. The electrical power system of claim 4, further comprising receiving, via the cluster-level controllers, a voltage feedback signal from a secondary winding of the cluster transformer or a point of common coupling and determining a voltage error as a function of the voltage value and the voltage feedback.

6. The electrical power system of claim 5, further comprising generating, via a voltage regulator, a second output based on the voltage error, wherein the voltage regulator comprises at least one of a proportional integral (PI) controller, a proportional derivative (PD) controller, a proportional integral derivative (PID) controller, or a state space controller.

7. The electrical power system of claim 6, further comprising limiting, via each of the cluster-level controllers, the second output from the voltage regulator based on a maximum current condition and a minimum current condition to obtain the cluster-level reactive current command.

8. The electrical power system of claim 1, wherein the partial power transformer comprises at least one of a two-winding transformer or a three-winding transformer.

9. The electrical power system of claim 1, wherein the generator of each of the electrical power subsystems comprises a doubly-fed induction generator (DFIG).

10. The electrical power system of claim 1, wherein the electrical power system comprises a wind farm, and wherein the electrical power subsystems comprise wind turbine power systems.

11. A method for controlling an electrical power system, the electrical power system having a plurality of clusters of electrical power subsystems with a cluster transformer connecting each cluster of electrical power subsystems to a power grid, each of the electrical power subsystems having a power converter electrically coupled to a generator with a generator rotor and a generator stator, each of the electrical power subsystems defining a stator power path and a converter power path for providing power to the power grid, the converter power path containing a two-winding power transformer, the method comprising:
   receiving, via a plurality of cluster-level controllers, a reactive power command from a system-level controller;
   generating, via the plurality of cluster-level controllers, a cluster-level reactive current command for each cluster of electrical power subsystems based on the reactive power command; and distributing, via the cluster-level controllers, a subsystem-level reactive current command to subsystem-level controllers of the electrical power subsystems based on the cluster-level reactive current command.

12. The method of claim 11, further comprising:
receiving, via the plurality of cluster-level controllers, a reactive power feedback signal;
determining, via the plurality of cluster-level controllers, a reactive power error as a function of the reactive power command for each cluster and the reactive power feedback signal; and,
generating, via each of the cluster-level controllers, the cluster-level reactive current command for each cluster of electrical power subsystems based on the reactive power error.

13. The method of claim 12, wherein generating, via each of the cluster-level controllers, the cluster-level reactive current command for each cluster of electrical power subsystems based on reactive power error further comprises:
generating, via a reactive power regulator, a first output based on the reactive power error, wherein the reactive power regulator comprises at least one of a proportional integral (PI) controller, a proportional derivative (PD) controller, a proportional integral derivative (PID) controller, or a state space controller.

14. The method of claim 13, further comprising limiting, via each of the cluster-level controllers, the first output from the reactive power regulator based on a maximum voltage condition and a minimum voltage condition to obtain a voltage value.

15. The method of claim 14, further comprising receiving, via the cluster-level controllers, a voltage feedback signal from a secondary winding of the cluster transformer or a point of common coupling and determining a voltage error as a function of the voltage value and the voltage feedback.

16. The method of claim 15, further comprising generating, via a voltage regulator, a second output based on the voltage error, wherein the voltage regulator comprises at least one of a proportional integral (PI) controller, a proportional derivative (PD) controller, a proportional integral derivative (PID) controller, or a state space controller.

17. The method of claim 16, further comprising limiting, via each of the cluster-level controllers, the second output from the voltage regulator based on a maximum current condition and a minimum current condition to obtain the cluster-level reactive current command.

18. A wind farm, comprising:
a plurality of wind turbine clusters each comprising a plurality of wind turbines, each of the wind turbines having a power converter electrically coupled to a generator with a generator rotor and a generator stator, each of the wind turbines defining a stator power path and a converter power path for providing power to the power grid, the converter power path containing a partial power transformer;
a cluster transformer connecting each cluster of wind turbines to a power grid; and,
a plurality of cluster-level controllers, each of the cluster-level controllers communicatively coupled to one of the wind turbine clusters, the cluster-level controllers configured to perform one or more operations, the one or more operations comprising:
receiving a reactive power command from a farm-level controller;
generating a cluster-level reactive current command for each cluster of wind turbines based on the reactive power command; and,
distributing a turbine-level reactive current command to turbine-level controllers of the wind turbines based on the cluster-level reactive current command.

19. The wind farm of claim 18, wherein the partial power transformer comprises at least one of a two-winding transformer or a three-winding transformer.

20. The wind farm of claim 18, wherein the one or more operations further comprise:
receiving a reactive power feedback signal;
determining a reactive power error as a function of the reactive power command for each cluster and the reactive power feedback signal; and,
generating the cluster-level reactive current command for each cluster of wind turbines based on the reactive power error.

* * * * *